(12) United States Patent
Uhlir et al.

(10) Patent No.: US 8,182,348 B2
(45) Date of Patent: May 22, 2012

(54) METHOD FOR COMPARING PERFORMANCES ON REMOTELY LOCATED COURSES

(75) Inventors: Kurt Brooks Uhlir, Chicago, IL (US);
Michael V. Shuman, Chicago, IL (US);
Christopher Dougherty, Highland Park, IL (US)

(73) Assignee: Navteq B.V., Veldhoven (NL)

( * ) Notice: Subject to any disclaimer, the term of this patent is extended or adjusted under 35 U.S.C. 154(b) by 0 days.

(21) Appl. No.: 13/018,739

(22) Filed: Feb. 1, 2011

(65) Prior Publication Data
US 2011/0124469 A1    May 26, 2011

Related U.S. Application Data

(62) Division of application No. 10/825,574, filed on Apr. 15, 2004, now Pat. No. 7,901,292.

(51) Int. Cl.
*A63F 9/14* (2006.01)
(52) U.S. Cl. .................. 463/59; 463/6; 463/42; 434/255
(58) Field of Classification Search .................. 434/247, 434/255; 463/6, 23, 42; 482/4, 8, 51, 54
See application file for complete search history.

(56) References Cited

U.S. PATENT DOCUMENTS

| | | |
|---|---|---|
| 2,026,082 A | 12/1935 | Darrow |
| 4,303,394 A | 12/1981 | Berke et al. |
| 4,523,204 A | 6/1985 | Bovay |
| 5,240,417 A | 8/1993 | Smithson et al. |
| 5,335,188 A | 8/1994 | Brisson |
| 5,451,922 A | 9/1995 | Hamilton |
| 5,526,479 A | 6/1996 | Barstow et al. |
| 5,573,402 A | 11/1996 | Gray |
| 5,616,079 A | 4/1997 | Iwase et al. |
| 5,652,570 A | 7/1997 | Lepkofker |
| 5,812,049 A | 9/1998 | Uzi |
| 6,009,375 A | 12/1999 | Sakumoto et al. |
| 6,013,007 A | 1/2000 | Root et al. |
| 6,032,108 A | 2/2000 | Seiple et al. |
| 6,066,075 A * | 5/2000 | Poulton ........................... 482/8 |
| 6,072,751 A | 6/2000 | Kirson et al. |
| 6,080,063 A | 6/2000 | Khosla |
| 6,098,015 A | 8/2000 | Nimura et al. |
| 6,155,927 A * | 12/2000 | Levasseur et al. ............. 463/42 |
| 6,183,364 B1 | 2/2001 | Trovato |
| 6,184,823 B1 | 2/2001 | Smith et al. |

(Continued)

FOREIGN PATENT DOCUMENTS

EP    1 198 274 B1    5/2005

(Continued)

OTHER PUBLICATIONS

Quick, After Him: Pac-Man WentThataway, The New York Times, Section 9—Sunday Styles, pp. 1 and 11. (May 9, 2004).

(Continued)

*Primary Examiner* — Kang Hu
(74) *Attorney, Agent, or Firm* — Adil M. Musabji; Frank Kozak; Jon D. Shutter

(57) ABSTRACT

A method and system are disclosed for comparing the performance of a participant in an event that includes movement along a course to another performance. The performance by the participant is monitored. Using a geographic database that represents the area in which the course is located, the participant's performance is compared to another performance. Then, the participant is provided with information comparing the performances.

16 Claims, 8 Drawing Sheets

U.S. PATENT DOCUMENTS

| | | |
|---|---|---|
| 6,401,033 B1 | 6/2002 | Paulauskas et al. |
| 6,430,997 B1 | 8/2002 | French et al. |
| 6,450,922 B1 * | 9/2002 | Henderson et al. ............... 482/8 |
| 6,463,385 B1 | 10/2002 | Fry |
| 6,509,869 B2 | 1/2003 | Aoyama |
| 6,612,925 B1 | 9/2003 | Forsberg |
| 6,677,858 B1 | 1/2004 | Faris et al. |
| 6,726,567 B1 * | 4/2004 | Khosla ............................ 463/42 |
| 6,837,827 B1 | 1/2005 | Lee et al. |
| 6,885,971 B2 | 4/2005 | Vock et al. |
| 6,921,351 B1 * | 7/2005 | Hickman et al. ................. 482/8 |
| 7,072,789 B2 | 7/2006 | Vock et al. |
| 7,085,648 B2 | 8/2006 | Ishiguro |
| 7,092,846 B2 | 8/2006 | Vock et al. |
| 7,118,498 B2 | 10/2006 | Meadows et al. |
| 7,217,224 B2 * | 5/2007 | Thomas ............................ 482/8 |
| 7,292,867 B2 * | 11/2007 | Werner et al. .............. 455/456.3 |
| 2003/0195023 A1 | 10/2003 | Di Cesare |
| 2004/0224740 A1 * | 11/2004 | Ball et al. ........................ 463/6 |
| 2004/0225467 A1 | 11/2004 | Vock et al. |
| 2005/0014113 A1 | 1/2005 | Fleck et al. |
| 2005/0148388 A1 * | 7/2005 | Vayra et al. ..................... 463/32 |
| 2006/0015287 A1 | 1/2006 | Vock et al. |
| 2006/0136173 A1 | 6/2006 | Case et al. |
| 2006/0259268 A1 | 11/2006 | Vock et al. |

FOREIGN PATENT DOCUMENTS

| | | |
|---|---|---|
| WO | WO 01/42809 A2 | 6/2001 |
| WO | WO 02/26518 A1 | 4/2002 |
| WO | WO 02/39363 A1 | 5/2002 |

OTHER PUBLICATIONS

Pac Manhattan, http://pacmanhattan.com/yourcity.php, pp. 1-3, (2004).

Map Quests, Wired, p. 052 (Feb. 2004).

* cited by examiner

US 8,182,348 B2

METHOD FOR COMPARING PERFORMANCES ON REMOTELY LOCATED COURSES

REFERENCE TO RELATED APPLICATIONS

The present application is a divisional of application Ser. No. 10/825,574 filed Apr. 15, 2004 (now U.S. Pat. No. 7,901, 292), the entire disclosure of which is incorporated by reference herein.

BACKGROUND OF THE INVENTION

The present invention relates to systems and applications that enable persons who are located in different areas to engage in athletic or recreational events, such as competitions or training, and compare their performances relative to each other.

Many popular sporting and recreational events and activities involve movement or travel along a course located in a geographic area. Examples of such events and activities include jogging, footraces, bicycle races, road rallies, triathlons, soap box derbies, dog sled racing, cross-country skiing, rollerblading, race walking, steeplechases, wheelchair racing, rowing, etc. Actual competitions (e.g., races) in these events or activities are popular as well as training for these events or activities. These events and activities are popular for both participants and spectators.

In general, each of these activities and events occurs in a specified place at a specified time over a specified course in order to present an equal course or set of conditions for all participants. These considerations may limit or constrain the number of people who can participate in such events or activities. Further, these considerations may limit or detract from a person's ability to participate or train for such events.

Accordingly, it is an objective to provide a means by which a person can participate in an event that involves movement along a course located in a geographic area and compare his/her performance to another performance, wherein the other performance occurs at the same time but in another geographic area.

It is another objective to provide a means by which a person can participate in an event that involves movement along a course located in a geographic area and compare his/her performance to another performance, wherein the other performance occurred at another time.

SUMMARY OF THE INVENTION

To address these and other objectives, the present invention includes a system and method for comparing the performance of a participant in an event that includes movement along a course to another performance. The performance by the participant is monitored. Using a geographic database that represents the area in which the course is located, the participant's performance is compared to another performance. Then, the participant is provided with information comparing the performances.

The performances that are compared may be by different participants or by the same participant, but performed at different times. The performances that are compared may be along the same course in the same geographic area or may be along similar (or equivalent) courses in different geographic areas. Other alternatives are described.

DETAILED DESCRIPTION OF THE PRESENTLY PREFERRED EMBODIMENTS

I. Compared Performance Events—Multiple Locations

A. System

Figure 1:
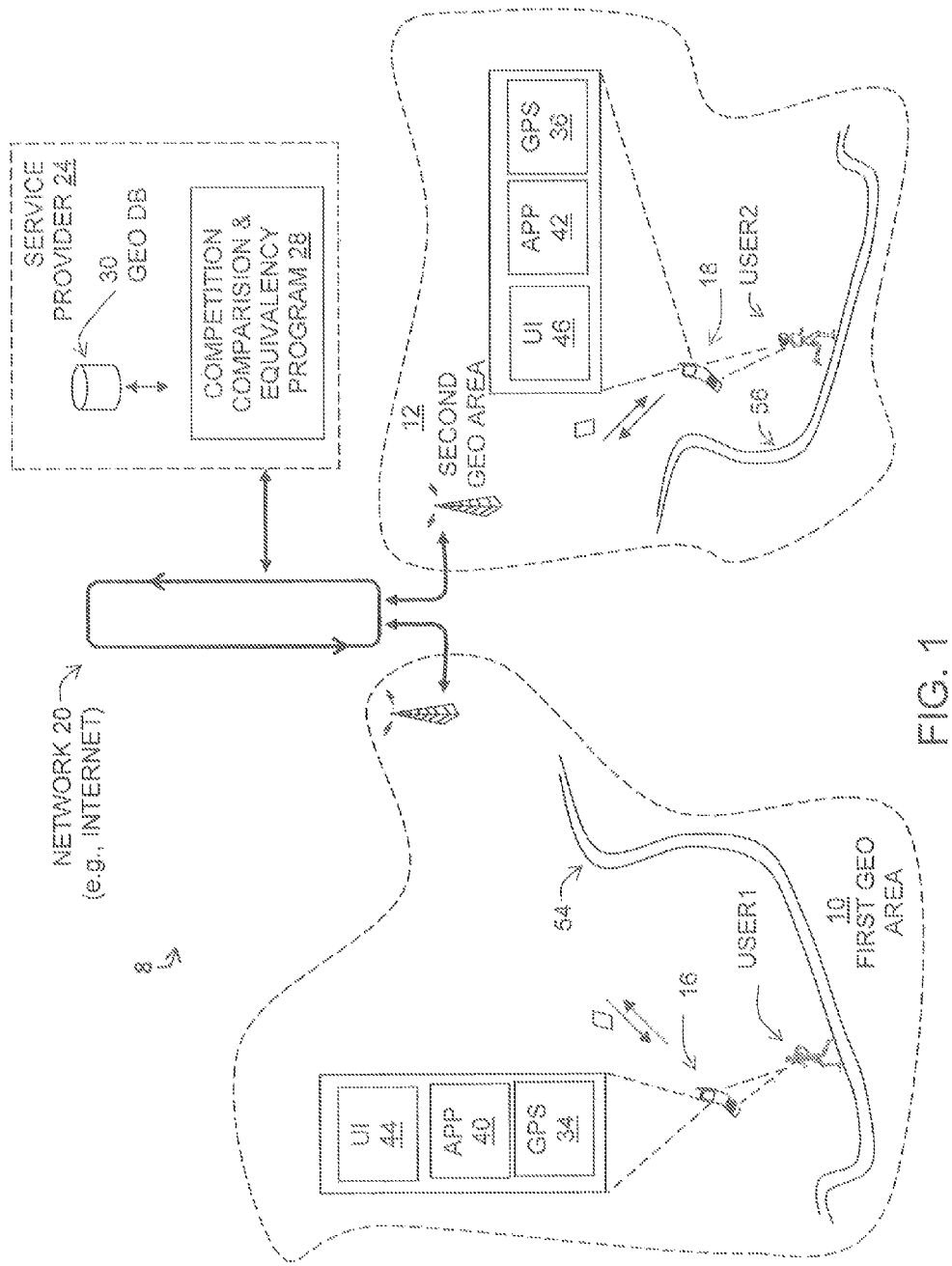
FIG. 1 is a diagram that illustrates an embodiment of a system that enables persons located in different geographic areas to participate in an event that involves movement along courses in their respective geographic areas and compare their performances.

FIG. 1 shows an embodiment of a system 8 that enables persons located in different geographic areas to participate (e.g., compete, train, practice, etc.) with each other in a recreational or sporting activity that involves movement along courses located in the geographic areas. In FIG. 1, a first participant, USER1, is located in a first geographic area or location 10. A second participant, USER2, is located in a second geographic area or location 12. The first and second areas may be different cities, such as Chicago and Moscow, different states, different countries, and so on. Although only two participants are shown in FIG. 1, it should be understood that the embodiment is not limited to only two participants and that many participants may take part.

The first participant and the second participant want to take part in (or practice for) an event together at the same time while each is in his/her respective geographic area. In this embodiment, the event is one that involves covering some distance over a course in a geographic area. Examples of such events include running, bicycling, road rallies, triathlons, soap box derbies, dog sled racing, cross-country skiing, sledding, roller blade racing, race walking, wheelchair racing, steeplechases, rowing, skateboarding, street luge, adventure racing, snow boarding, rock climbing, extreme runs, and so on.

In this embodiment, the participants, USER1 and USER2, have mobile communications devices, 16 and 18, respectively. The mobile communications devices, 16 and 18, are wireless devices that enable the participants to communicate with a data network 20 while moving through their respective geographic areas. In one embodiment, the communications devices are cell or mobile phones that use any suitable wireless technology, including but not limited to PCS, GPRS, EDGE or WIFI. Alternatively, the communications devices may be PDAs. According to another embodiment, the devices may be specialized sports devices. The participants do not need to use the same type of communications device.

The data network 20 may include any communications network or system that enables the exchange of data between locations. Examples include the Internet, telephone systems, proprietary systems, satellite systems, and so on.

The participants, USER1 and USER2, use their communications devices to communicate over the data network 20 with a service provider 24. The service provider 24 includes hardware and software capable of sending data to and receiving data from the participants over the data network 20. The service provider also includes hardware and software capable of storing and executing programs. For example, the service provider may have one or more servers with suitable processors, data storage (e.g., hard drives, CD-ROMs, DVDs), memory (e.g., RAM), and so on.

The service provider 24 includes a competition comparison and equivalency program 28. The competition comparison and equivalency program 28 is a software program. A copy of the competition and comparison equivalency program 28 is stored on an appropriate data storage medium of the service provider and loaded into memory where is it run. The competition and comparison equivalency program 28 can be used for various applications to enable users located in different locations to compete against or train with each other, as explained below.

The competition comparison and equivalency program 28 uses a geographic database 30. The geographic database 30 is accessible to the service provider 24 and may be located with the service provider 24. The geographic database 30 includes data that represents various geographic features located in the geographic areas, 10 and 12. For example, the geographic database 30 includes data about road networks located in the geographic areas 10 and 12. The data about the road network include various kinds of information, such as the geographic coordinates (e.g., latitude, longitude, altitude) of positions of the roads, street names of the roads, which roads connect to other roads, landmarks, addresses ranges along the roads, and so on. In addition, the geographic database 30 may include data that indicates walkways, pedestrian paths, bicycle paths, hiking and jogging rails, waterways, as well as various other improved and/or unimproved means for traveling across the geographic areas.

The geographic database 30 may also include data about points of interest, such as hotels, restaurants, museums, stadiums, offices, automobile dealerships, auto repair shops, etc., located in the geographic areas. The geographic database 30 may also include data about other geographic features, such as bodies of water, mountain ranges, surface types, land cover, as well as other kinds of information.

In this embodiment, the participants, USER1 and USER2, each carry positioning equipment 34 and 36. The positioning equipment 34 and 36 includes hardware and software capable of determining each participant's position in his/her respective geographic area. In one embodiment, the positioning equipment is a GPS unit. Alternatively, the positioning equipment may include DGPS units, cell phone positioning technology (e.g., triangulation, time- or direction-of-arrival, etc.), beacons, timing chips, systems that use a RFID tag on the participant used in combination with sensors along the course, or any other technology by which the position of the user can be determined. (The positioning equipment carried by each participant may use or rely on other technology that is not carried by the participant, e.g., a GPS unit carried by a participant relies on signals from GPS satellites.) In this embodiment, the positioning equipment 34 is included as part of each of the mobile communications devices 16 and 18.

In addition, in this embodiment the mobile communications devices 16 and 18 include client applications 40 and 42, respectively. The client applications 40 and 42 provide for supporting and coordinating functions associated with the competition and comparison equivalency program 28, as explained below. The communications devices, 16 and 18, also include user interfaces, 44 and 46, respectively. Each user interface provides information to and accepts information from the participant.

B. Operation

Figure 2:
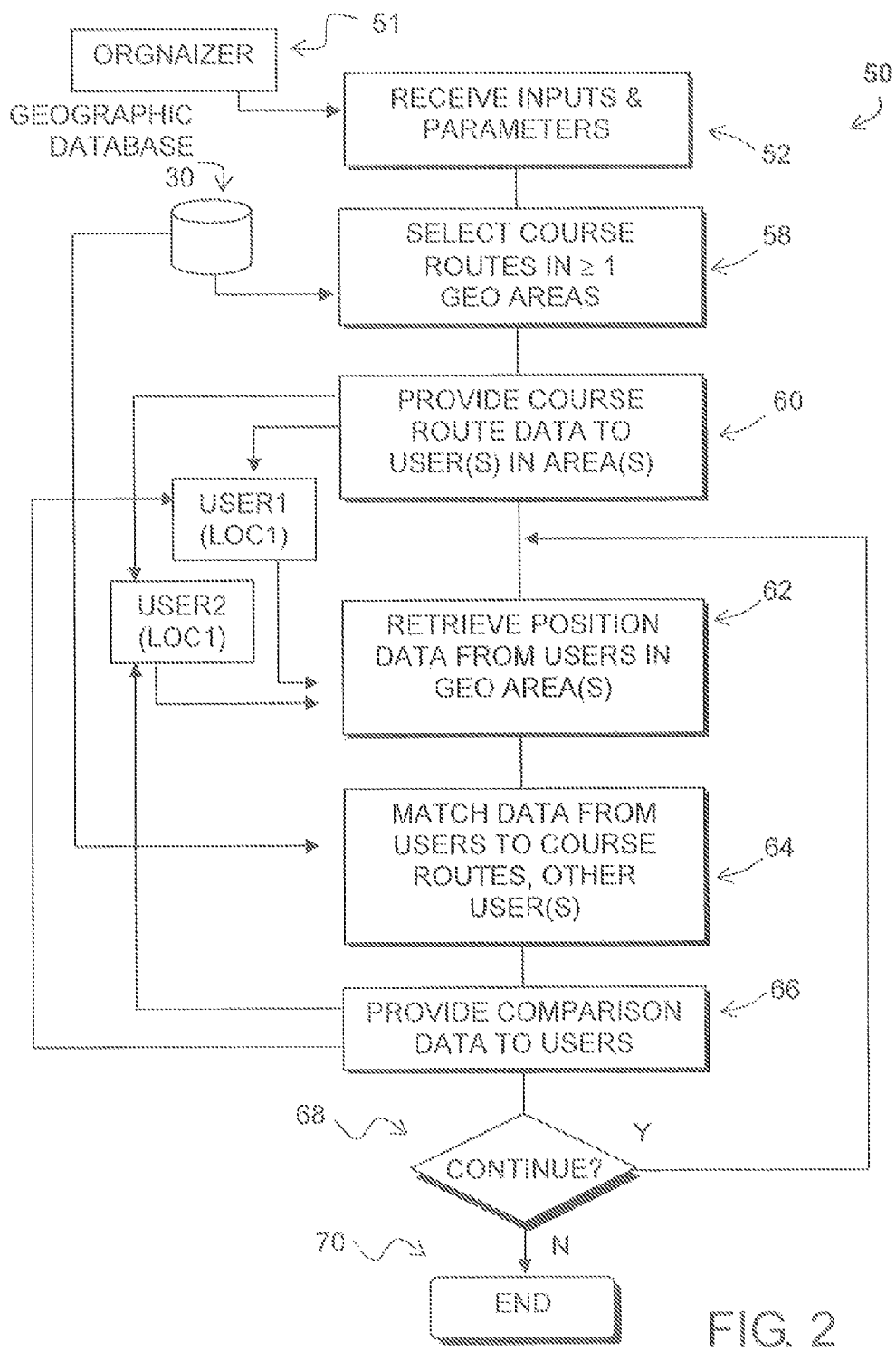
FIG. 2 is a flowchart of a process performed by the system of FIG. 1.

FIG. 2 shows a process 50 performed by the system 8 of FIG. 1 for enabling comparisons of performances between persons located in different geographic areas. There are various alternative ways by which the system 8 of FIG. 1 can enable performance comparisons between persons in different geographic areas. In one alternative, an event organizer 51 (who may be one of the participants) accesses the competition and comparison equivalency program 28 to set up a multiple-location event. At this stage, the race organizer provides several parameters or inputs to the competition and comparison equivalency program 28 (Step 52). These parameters or inputs may include an approximate starting time, an identification of each of the multiple locations where the events will be held and a race distance. There may be other inputs and/or parameters in addition to these. For example, the event organizer 51 may input information that indicates the approximate starting locations (in one or more of the multiple geographic areas), the type of event (e.g., foot race, bicycle, dog sled, rowing, wheelchair race, and so on). Selection of inputs and parameters may be an interactive or iterative process. For example, the event organizer 51 may input a desired starting location to which the competition and comparison equivalency program 28 responds with one or more alternative starting locations.

With these inputs, the competition and comparison equivalency program 28 determines multiple course routes (labeled 54 and 56 in FIG. 1), one for each of the multiple geographic areas (Step 58 in FIG. 2). In determining the multiple course routes, the competition and comparison equivalency program 28 uses the geographic database 30. The competition and comparison equivalency program 28 attempts to match the multiple course routes as much as possible. For example, the competition and comparison equivalency program 28 attempts to select course routes that have the same length, the same changes in elevation, the same changes in direction, the same surfaces, and so on or that will have an equivalent effect on each participant. If climatological information is available, the competition and comparison equivalency program 28 may attempt to determine course routes that have matching wind direction, temperature, and humidity. This may be an interactive or iterative process in which the competition and comparison equivalency program 28 proposes candidate course routes to the event organizer 51 and the event organizer chooses the course routes from the proposed candidate routes.

Once a route has been selected for each of the multiple geographic areas, route information is provided to the participants (Step 60). In one embodiment, the route information is downloaded from the service provider 24 to the participants' communications devices 16 and 18. The client applications 40 and 42 in the participants' communications devices 16 and 18, respectively, include functions for storing and using the route information.

In this embodiment, the events are started simultaneously in each of the multiple geographic areas. During the events, as each of the participants moves along the course route in his/her respective geographic area, the participant's location is determined using the positioning equipment 34 or 36 carried by the participant. The participant's location is matched to the course route that he/she is moving along. This matching may be done by the client application 40 or 42 in the participant's communications device. In addition, each participant's location (or matched position along his/her course route) is transmitted to the competition and comparison equivalency program 28 (Step 62). The competition and comparison equivalency program 28 matches each participant's position along his/her course against the other participant's position along his/her course route (Step 64). In other words, referring to FIG. 1, the relative position of USER1 along the course route 54 in the first geographic area 10 is matched to the relative position of USER2 along the course route 56 in the second geographic 12. The competition and comparison equivalency program 28 transmits data to each participant's communications device that indicates the other participant's relative position. For example, the competition and comparison equivalency program 28 transmits data to USER1 that indicates the relative position of USER2 along the course route 56 in the second location 12. In addition, a comparison between the relative positions of USER1 and USER2 along their respective course routes is made. (This comparison information may be provided by the competition and comparison equivalency program 28 or by the client applications 40 or 42.) Information indicating the relative positions of the participants is presented to each of them via the respective user interface of his/her communications device. The user interface may convey this information in any suitable way, e.g., audible messages, visual displays (graphic or numeric), cues, and so on.

Since the course routes in the multiple geographic locations are selected to be approximately equivalent, a comparison of the relative positions of the users along their respective course routes indicates how the users compare to each other. In this way, the participants can compete against each other (or train with each other) even though they are in different geographic locations.

The process 50 (in FIG. 2) continues (Step 68) until the event is over (Step 70).

As mentioned above, there are various alternative ways that the competition and comparison equivalency program 28 can be used. For example, the event organizer, i.e., the person who accesses the competition and comparison equivalency program 28 to set up a multiple-location competition, may be one or more of the participants.

The competition and comparison equivalency program 28 may be used for training purposes. For example, a person in one geographic location may wish to train with a person in another location, instead of (or in addition to) racing against the other person.

In another embodiment, the functions of the competition and comparison equivalency program 28 may be performed entirely by the client application(s) 40 or 42 in the end users' communications devices 16 and 18.

The event may be planned (as described above) or may be organized on an ad hoc basis.

The users may be able to communicate (e.g., speak, instant message, text message) with each other. For example, in the example where the competition and comparison equivalency program 28 is being used for training purposes, the participants may want to talk to each other about their training, their respective environments, etc.

The user interfaces of the communications devices may include display screens that provide graphical representations of the courses to the users. In additions, the relative positions of the users may be indicated on the depicted courses as the users move along the courses.

The system may include various additional features for recording times, efforts, and records. This kind of information may be recorded for each individual, e.g., a personal best. This kind of information may also be recorded for each different type of event, for each age bracket, for each geographic area, etc.

II. Compared Performance Events—Virtual Competitors

Figure 3:
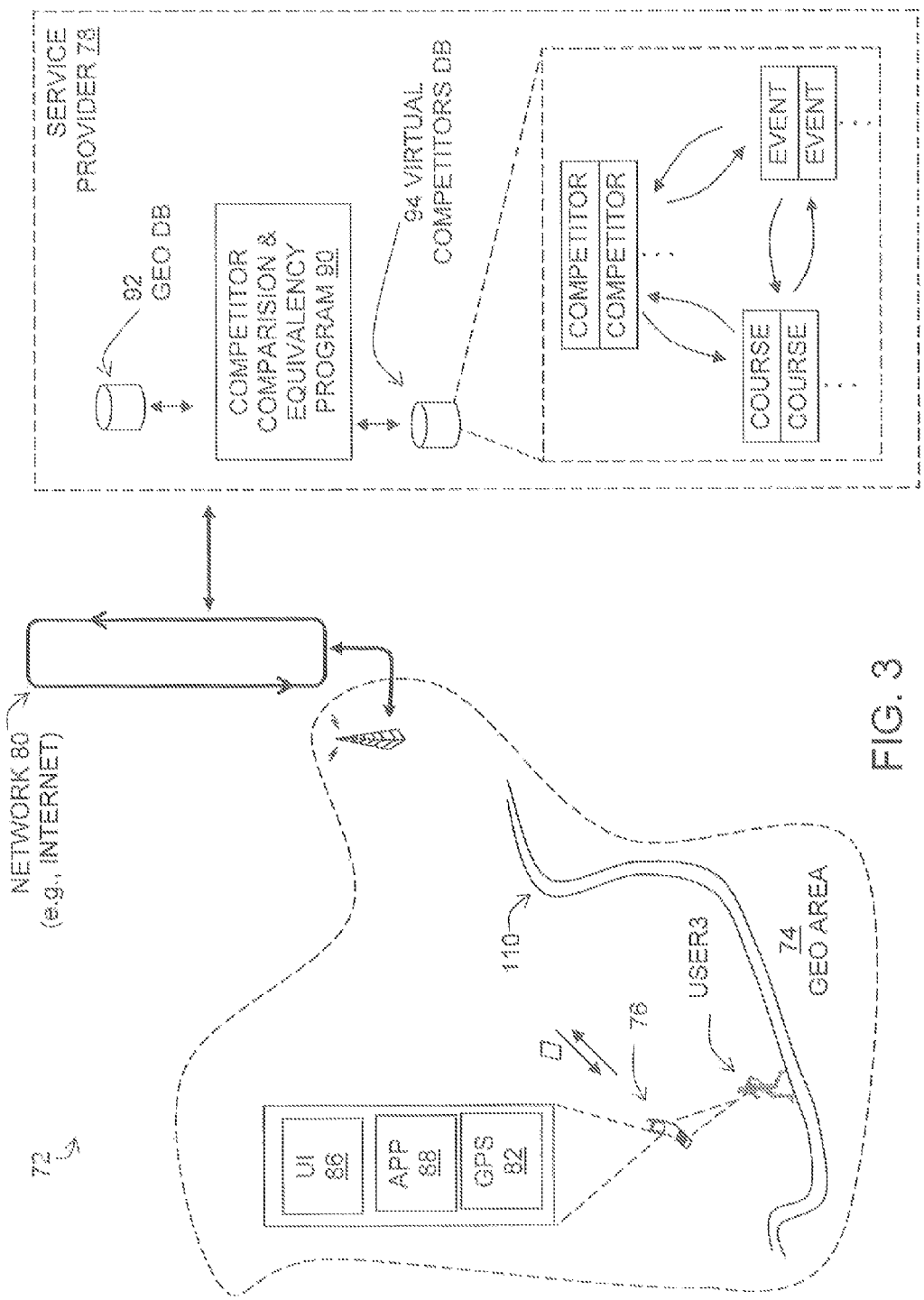
FIG. 3 a diagram that illustrates an embodiment of a system that enables a person to participate in an event that involves movement along a course and obtain a comparison of his/her performance relative to that of a virtual person moving along the same course or a similar course.

FIG. 3 shows an embodiment of a system 72 that enables a person in one geographic area to participate in an event that involves movement along a course in the geographic area and compare his/her performance against a virtual competitor. The system 72 simulates movement of the virtual competitor along the same course as the participant is moving along or alternatively, the system 72 simulates movement of the virtual competitor along a different course in the same or a different geographic area. The system 72 in FIG. 3 is similar to the system 8 in FIG. 1 and like components are referred to by the same names.

In FIG. 3, a participant, USER3, is located in a geographic area 74. The geographic area 74 may be the same as either geographic area 10 or 12 in FIG. 1. For example, the geographic area 74 may be a city, such as Chicago, Los Angeles, Paris, Moscow, etc. The participant USER3, wants to engage in an event, such as running, bicycling, etc., that involves covering some distance over a course in the geographic area 74.

In this embodiment, the participant, USER3, has a communications device 76 that enables the user to access a service provider 78 over a data network 80. The communications device 76 includes positioning equipment 82 capable of determining the position of the user in the geographic area 74, a user interface 86 and a client application 88 that provides for various functions, as explained below. The service provider 78 runs a competition comparison and equivalency program 90 that uses a geographic database 92. In addition, the competition comparison and equivalency program 90 uses a virtual competitors database 94.

The virtual competitors database 94 includes entries for various courses, events, and competitor identities. Each course entry is associated with one or more event entries or sections of an event (e.g., a 10k subsection of the Boston Marathon), which is associated with one or more competitor identity entries. The course entries represent either fictional or known courses, such as the course of the Boston Marathon. The event entries represent either fictional or known events, such as the 2000 Olympics. The competitor identity entries represent either fictional or real persons, such as professional or amateur athletes, celebrities, etc. The virtual competitors database 94 may also include information that indicates each virtual competitor's expected performance or pace for an associated event. The virtual competitors database 94 may also include entries for an individual participant's own previous performances over various courses or in various events.

Figure 4:
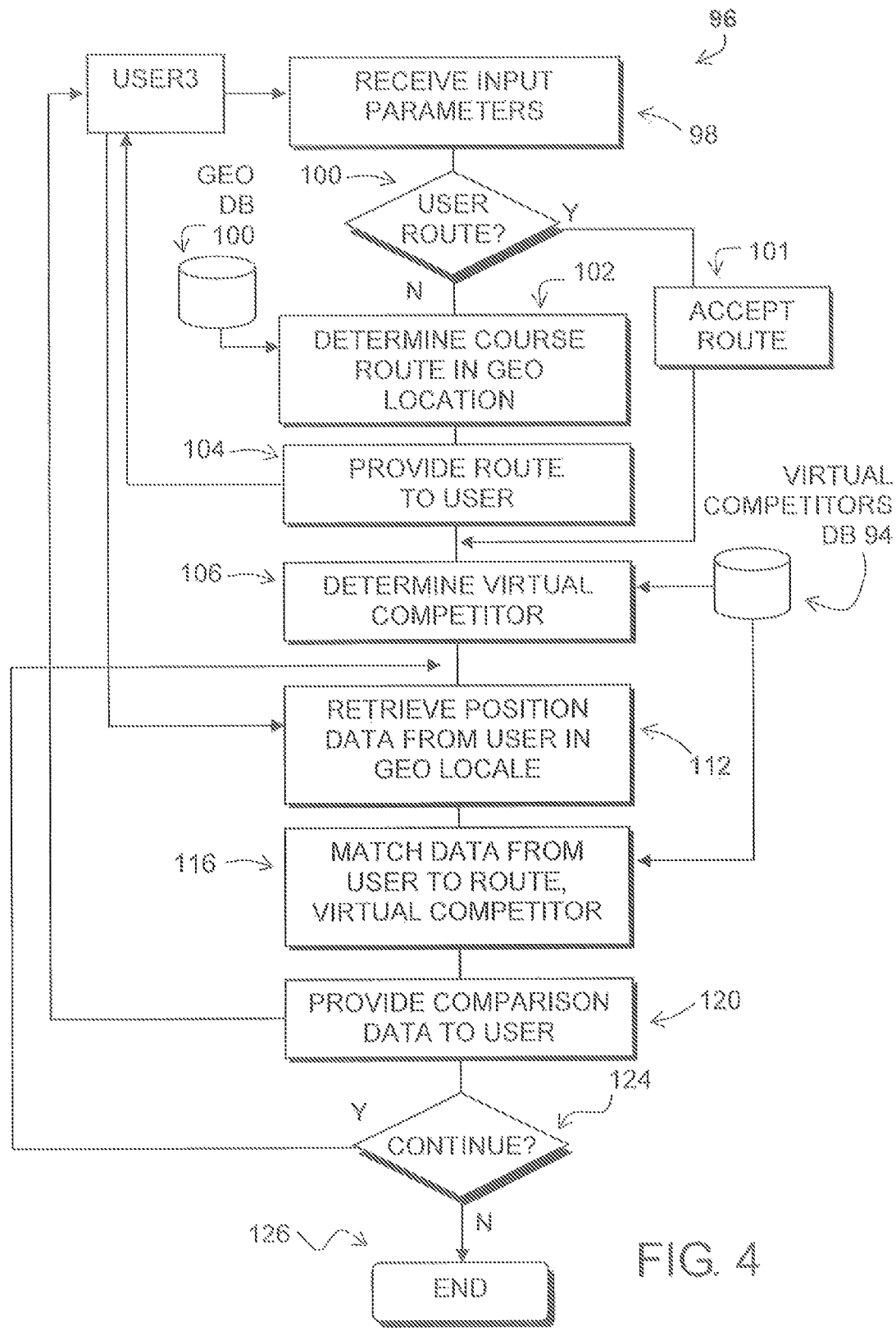
FIG. 4 is a flowchart of a process performed by the system of FIG. 3.

FIG. 4 shows a process 96 performed by the system 72 of FIG. 3 for enabling the participant, USER3, to participate in an event that involves movement along a course route in the geographic area 74 and compare his/her performance against a virtual competitor. The participant USER3 accesses the competition and comparison equivalency program 90 to set up a virtual competitor comparison. USER3 accesses the competition and comparison equivalency program 90 over the data network 78 using his/her communications device 76. USER3 provides several initial parameters or inputs to the competition and comparison equivalency program 90 (Step 98). USER3 has the option of providing a course route to the competition and comparison equivalency program 90 (Step 100). If the participant wants to provide the course route, the participant indicates the course route to the competition and comparison equivalency program 90 at this initial stage (Step 101). For example, the participant may input a course distance, an approximate starting time, an identification of an approximate starting location, and the type of race (e.g., foot race, bicycle, dog sled, and so on). Additionally, the participant may input other information such as a course pace. There may be other inputs and/or parameters in addition to these. Selection of input parameters may be an interactive or iterative process.

Alternatively, if the participant does not want to provide a course route, the participant provides input parameters so that the competition and comparison equivalency program 90 can determine a course route. If the participant does not provide a course route, the competition and comparison equivalency program 90 determines a course route for the participant based on the inputs provided by the participant (Step 102). This course route is provided to the participant (Step 104). In one embodiment, the course route information is downloaded from the service provider 78 to the participant's communications device 76.

Next, the competition and comparison equivalency program 90 determines a virtual competitor (Step 106). The virtual competitor is selected from the virtual competitor database 94. In selecting the virtual competitor, the competition and comparison equivalency program 90 uses various criteria. For example, the virtual competitor may be selected based on the expected pace input by the participant. Alternatively, the virtual competitor may be selected based on an association with the geographic location of the participant or another selected geographic location. The virtual competitor may be a celebrity or an athlete known for participation in the type of event. Information about the virtual competitor may be sent to the participant.

Next, the event begins. During the event, as the participant moves along the course (labeled 110 in FIG. 3), the participant's position is determined using the positioning equipment 82. Data indicating the participant's position is transmitted to the competition and comparison equivalency program 90 (Step 112). The competition and comparison equivalency program 90 matches the participant's position along his/her course against the virtual competitor's equivalent position along his/her course (Step 116). That is, given the elapsed time, the relative position of USER3 along the course 110 is matched to the relative position of the virtual competitor along the equivalent course. A comparison between the relative positions of USER3 and the virtual competitor may be made. The competition and comparison equivalency program 90 transmits data to the participant that indicates the virtual competitor's relative position (Step 120). This information is received by the client application 88 and provided to the participant via the user interface 86 of the communications device 76. In this way, USER3 can compete against the virtual competitor along an approximately equivalent course.

The process 96 (in FIG. 4) continues (Step 124) until the event is over (Step 126).

In an alternative embodiment, the device carried by the participant during the event does not need to have a communications capability. Instead, information about the virtual competitor and the course is obtained before the event from a program on a personal computer or from an online source. This information is stored in an electronic device which is then carried by the participant during the event. The participant's performance relative to the virtual competitor can be determined using programming installed entirely within the electronic device carried by the participant during the event.

As mentioned above, the virtual competitors database may include entries for an individual's own previous performances in events or on various courses. In this manner, a participant can measure his/her performance against his/her own previous performances, e.g., for training purposes.

III. Compared Performance
Events—Stationary/Mobile

Figure 5:
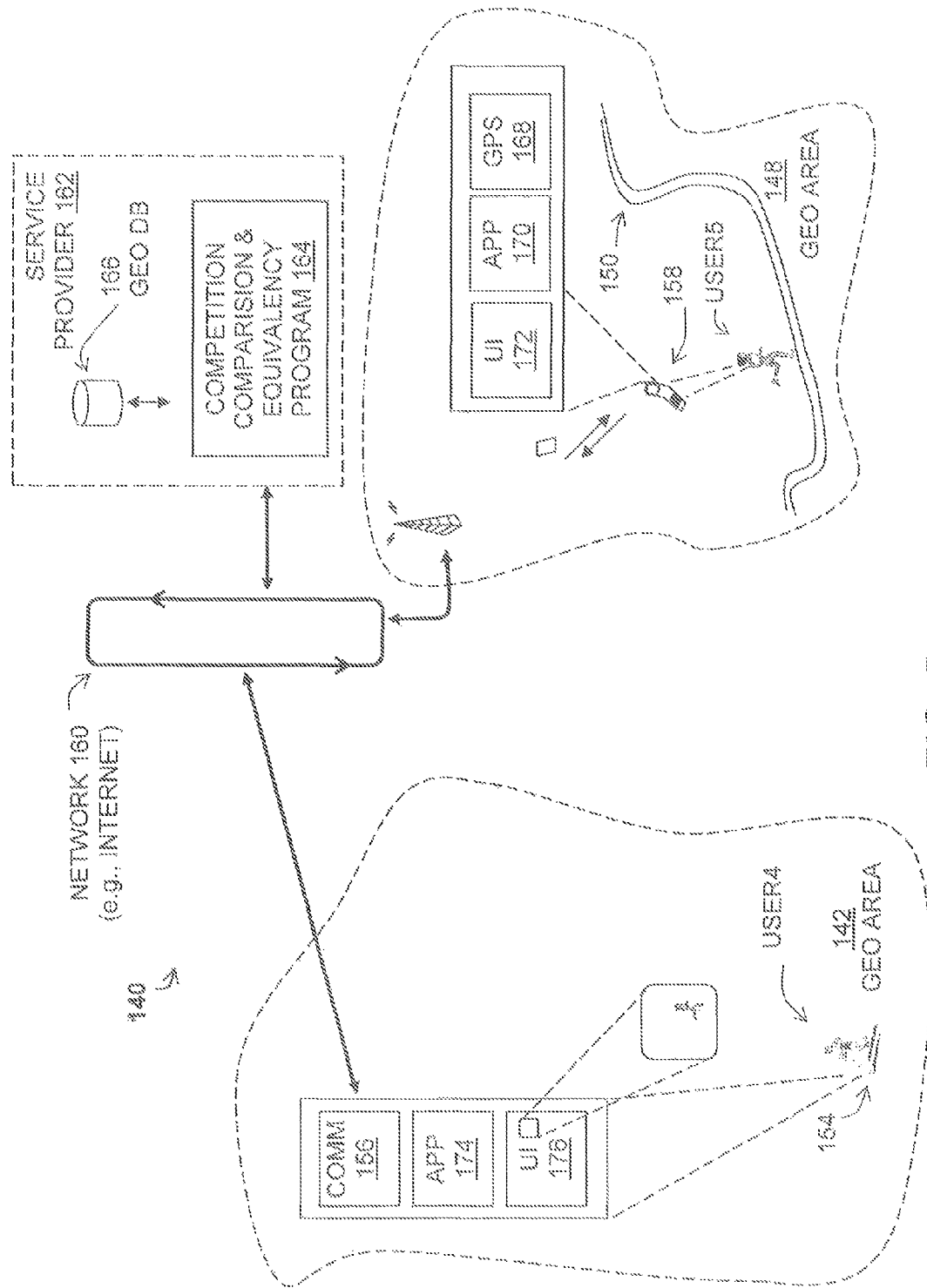
FIG. 5 a diagram that illustrates an embodiment of a system that enables a person using a machine that simulates movement along a course to obtain a comparison of his/her performance relative to that of another person moving along the actual course or a similar course.

FIG. 5 shows an embodiment of a system 140 that enables a participant who is using a stationary device that simulates movement along a course to participate in an event and compare his/her performance against another participant who is physically moving along the course. The system 140 in FIG. 5 is similar to the systems 8 and 72 in FIGS. 1 and 3, and like components are referred to by the same names.

In FIG. 5, a participant, USER4, is located in a first geographic area 142. Another participant, USER5, is located in another geographic area 148. The first and second geographic areas may be different cities, different states, different countries, and so on, including any of the areas mentioned in the previous embodiments. Although only two participants are shown in FIG. 5, it should be understood that the embodiment is not limited to only two participants and that many more participants may take part.

The participants, USER4 and USER5, want to take part in an event together at the same time while each is in his/her respective geographic area. In this embodiment, the event is one that involves covering some distance over a course in a geographic area. Examples of such events include running, bicycling, rowing, etc., as mentioned above. In this embodiment, USER5 will actually physically move along a course 150 in his/her geographic area 148 while USER4 will operate a machine 154 (also referred to as the "simulation machine") that remains stationary, but that simulates movement along the course 150. Examples of machines that simulate movement along a course include treadmills, exercise bicycles, rowing machines, cross-country skiing machines, stair stepping machines, driving simulators, and so on. The course over which movement by USER4 is simulated may be the same course 150 being actually physically covered by USER5. Alternatively, the courses may be different.

In this embodiment 140, the participant, USER5, has a mobile communications device 158. The communications device 158 is a wireless device that enables USER5 to communicate with a service provider 162 over a data network 160 while moving along the course 150. The service provider 162 includes a competition comparison and equivalency program 164 that uses a geographic database 166. In this embodiment, the communications device 158 carried by USER5 includes positioning equipment 168 capable of determining the user's position in the geographic area 148, a client application 170, and a user interface 172.

In this embodiment, the simulation machine 154 used by USER4 includes communications equipment 156. The communications equipment 156 is operatively coupled to the simulation machine 154 so that data can be exchanged between the simulation machine 154 and the service provider 162 via the data network 160. The simulation machine 154 also includes a client application 174 and a user interface 176. Alternatively, the functions of the communications device, the client application or the user interface may be provided in one or more separate devices.

Figure 6:
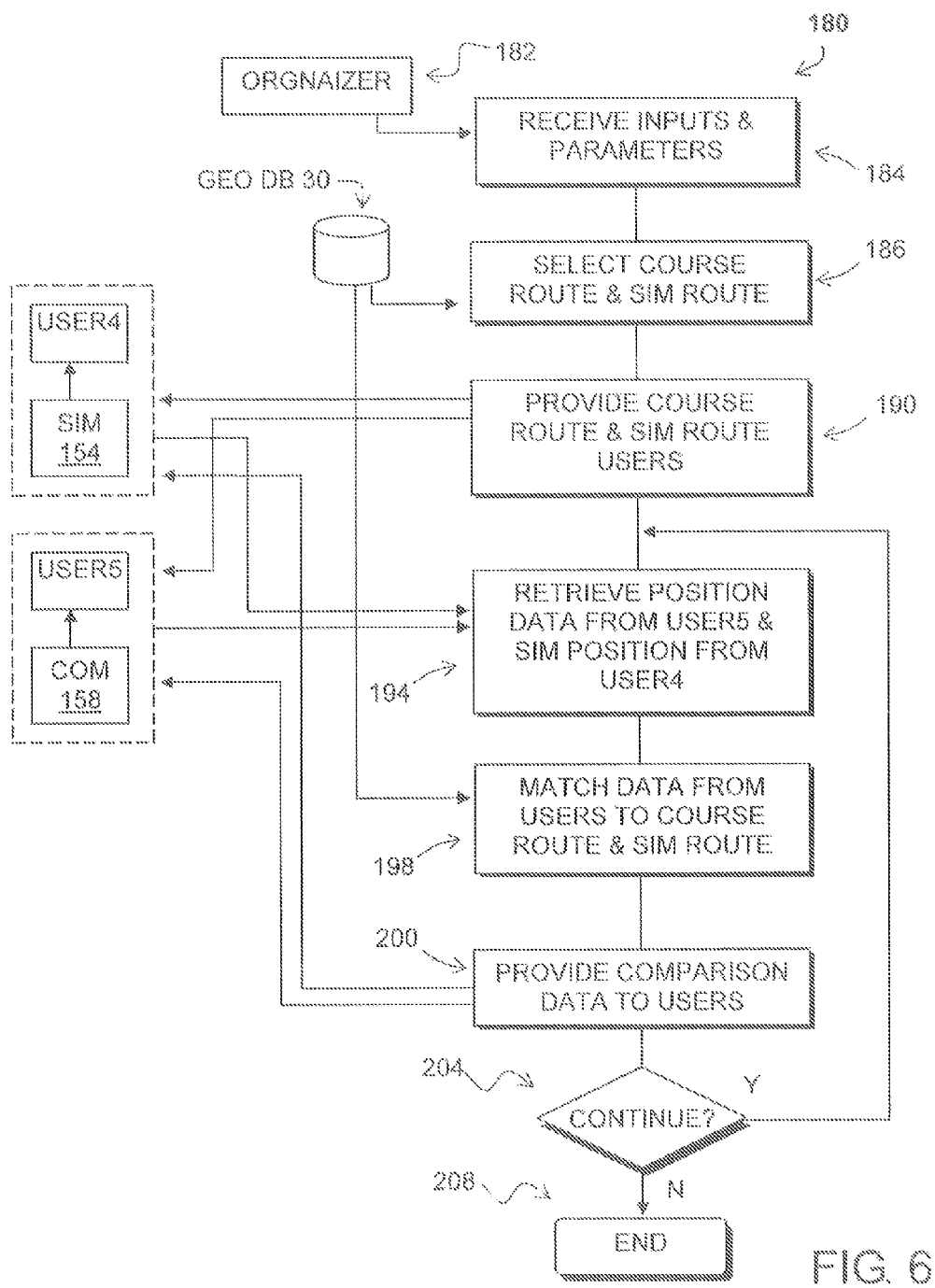
FIG. 6 is a flowchart of a process performed by the system of FIG. 5.

FIG. 6 shows a process 180 performed by the system 140 of FIG. 5 for enabling comparative performance events between a person physically moving along a course in one geographic area and another person using a stationary machine that simulates movement along the course.

In one alternative, an event organizer 182 (who may be one of the participants) accesses the competition and comparison equivalency program 164 to set up the event. As in the previous embodiments, the event organizer provides several initial parameters or inputs to the competition and comparison equivalency program 164 (Step 184). The competition and comparison equivalency program 164 determines multiple courses, one for each of the participants (Step 186). In this embodiment, the course for USER5 (i.e., the participant who will be actually moving) defines a route in the geographic area 148. The course for USER4 (i.e., the participant who will be operating the stationary simulation machine 154) defines a simulated route. The simulated route is formed so that it is similar to the actual route that USER5 will be covering. For example, the simulated route may be chosen to have the same length, the same changes in elevation, the same changes in direction, etc., as the actual route. The competition and comparison equivalency program 164 uses the geographic database 166 for the purpose of creating the simulated route with characteristics that are similar to those of the actual route.

Once the courses have been determined, route information is provided to the participants (Step 190). In one embodiment, the route information is downloaded from the service provider 164 to USER5's communications device 158 and the simulation machine 154. The client application 170 in the user's communications device 158 and the client application 174 in the simulation machine 154 include functions for storing and using the received route information. This information may be used by the simulation machine to simulate the event.

In this embodiment, the participants start along their respective courses at the same time. During the event, USER5 moves along the course route 150 in the geographic area 148. Simultaneously, USER4 uses the simulation machine 154 to simulate movement along the equivalent course. The application 174 in the simulation machine 154 uses the route data received from the competition and comparison equivalency program 164 to cause the simulation machine 154 to operate in a manner that provides USER4 with an experience that is similar to what he/she would have moving along the course 150 in the other geographic area 148. For example, the simulation machine 154 may increase an incline or resistance in order to simulate an uphill portion of the course.

During the event, USER5's location is determined using the positioning equipment 168 and matched to the course 150 that he/she is moving along. This matching may be done by the client application 170. Data indicating USER5's position and/or matched position is transmitted to the competition and comparison equivalency program 164 (Step 194). In addition, the simulation machine 154 determines a simulated position of USER4 based on USER4's effort. USER4's simulated position is matched to the simulated course by the application 174 in the simulation machine 154. Data indicating USER4's simulated matched position is transmitted to the competition and comparison equivalency program 164 (Step 194).

The competition and comparison equivalency program 164 matches each participant position along his/her (real or simulated) course against the other participant's position along his/her (simulated or real) course (Step 198). The competition and comparison equivalency program 164 transmits data to each participant that indicates the other participant's relative position (Step 200).

In this embodiment, the participant on the stationary machine may obtain additional information that enhances the simulation experience. For example, the participant on the stationary machine may be provided with video images and/or sounds. These video images and/or sounds may be provided to the participant by the user interface of the simulation machine or by other equipment located in proximity to the participant. The video images may show the participant what he/she would see from a point of view corresponding to the participant's simulated position along the actual course (i.e., a first-person view). Thus, the video images would change as the participant simulates movement along the course. Alternatively, the images may show an overhead or perspective view of the course (i.e., a third-person view). The images may be actual images of the actual course or alternatively, the images may be simulations based on the actual course. Methods for providing simulations based on actual route data are disclosed in the copending applications, "METHOD AND SYSTEM FOR USING GEOGRAPHIC DATA IN COMPUTER GAME DEVELOPMENT" Ser. No. 10/798,459, "APPLICATION PROGRAMMING INTERFACE FOR GEOGRAPHIC DATA IN COMPUTER GAMES" Ser. No. 10/798,531, and "GEOGRAPHIC AREA TEMPLATES FOR COMPUTER GAMES" Ser. No. 10/798,632, the entire disclosures of which are incorporated by reference herein. In one embodiment, an image of the other participant is superimposed in the image shown to the participant of the stationary machine.

Since the simulated course is determined to be similar to the actual course, a comparison of the relative positions of the participants along their respective courses indicates how the participants compare to each other.

The process 180 continues (Step 204) until the event is over (Step 208).

IV. Compared Performance
Events—Stationary/Stationary

Figure 7:
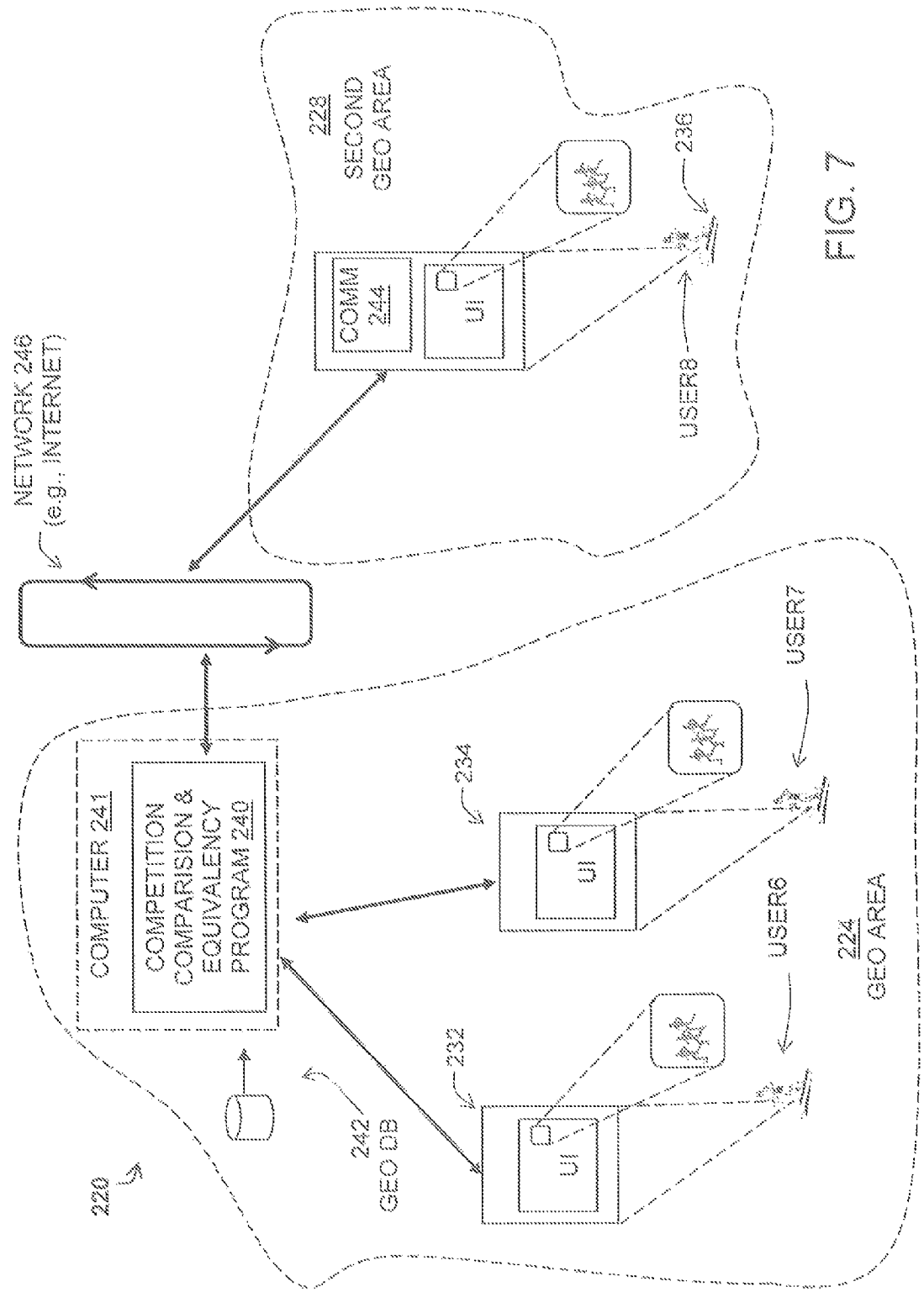
FIG. 7 a diagram that illustrates an embodiment of a system that enables multiple persons to use machines that simulates movement along a course and obtain comparisons of their performances relative to each other.

FIG. 7 shows an embodiment of a system 220 that enables a participant using a stationary device that simulates movement along a course in a geographic area to participate in an event and compare his/her performance against another participant who is also using a stationary device that simulates movement along the course. The system 220 in FIG. 7 is similar to the system 8 in FIG. 1, the system 72 in FIG. 3, and the system 140 in FIG. 5, and like components are referred to by the same names.

In FIG. 7, participants, USER6 and USER7 are located in a first geographic area 224. In one alternative, USER6 and USER7 are located in the same place, e.g., the same building which may be a gym or health club, in the first geographic area 224. Another participant, USER8, is located in another geographic area 228. The first and second geographic areas may be different cities, etc. Although three participants are shown in FIG. 7, the embodiment is not limited to use by three participants, but may be used by two participants or by more than three participants.

The participants want to engage in an event together at the same time while each is in his/her respective geographic area. As in the previous embodiments, the event is one that involves covering some distance over a course in a geographic area. In this embodiment, all the participants operate machines 232, 234 and 236 that remain stationary, but that simulate movement along a course in a geographic area. In this embodiment, all the participants simulate movement over the same simulated course. In alternative embodiments, some or all the participants may operate machines that simulate movement over different courses.

In this embodiment, the simulation machines 232 and 234 are coupled to and exchange data with a competition comparison and equivalency program 240. The competition comparison and equivalency program 240 is run on an appropriate computer hardware platform, such as a personal computer or server 241. If the simulation machines 232 and 234 and the computer hardware platform 241 are located in the same building, such as a gymnasium or health club, they can be connected together using cabling. Alternatively, the simulation machines 232 and 234 and the computer hardware platform 241 can communicate with each other wirelessly. The simulation machine 236, which is located in the other geographic area 228, uses communications equipment 244 and an appropriate network 246 to exchange data with the competition comparison and equivalency program 240. The competition comparison and equivalency program 240 uses a geographic database 242.

Figure 8:
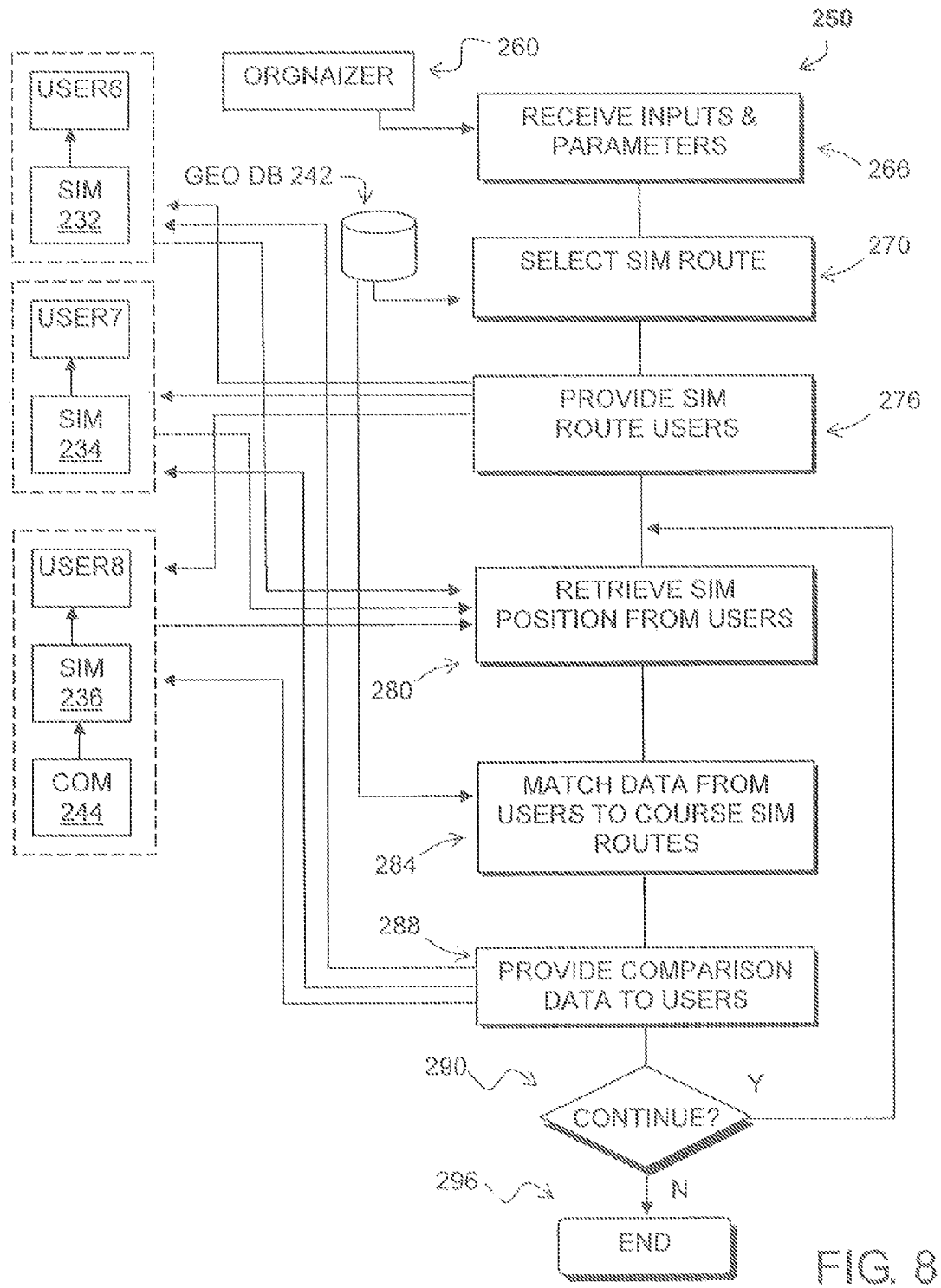
FIG. 8 is a flowchart of a process performed by the system of FIG. 7.

FIG. 8 shows a process 250 performed by the system 220 of FIG. 7. An event organizer 260 (who may be one of the participants) accesses the competition and comparison equivalency program 240 to set up an event that involve simulated movement over a simulated course. The event organizer provides several initial parameters (Step 266). The competition and comparison equivalency program 240 determines a simulated course for the participants (Step 270). In this embodiment, the course may be based on an actual course through a real geographic area. The competition and comparison equivalency program 240 uses the geographic database 242 to identify the characteristics of the actual course in order to determine characteristics for the simulated course that are similar or equivalent to those of the actual course. For example, the simulated course may be chosen to have the same length, the same changes in elevation, the same changes in direction, etc., as the actual course.

Once the course has been selected, route information is provided to the simulation machines being used by the participants (Step 276). In one embodiment, the route information is transmitted to the remotely located participant, USER8, over the network 246.

As in the previous embodiments, the participants start at the same time. During the event, the participants operate their respective stationary simulation machines to simulate movement along the selected course. The competition and comparison equivalency program 240 causes the simulation machines to operate in a manner that provides each participant with an experience that is similar to what he/she would have if he/she were actually moving along the actual course.

During the event, the competition and comparison equivalency program 240 determines each participant's simulated position based on the participant's effort (Step 280). Each participant's simulated position is matched to the simulated course. Each participant's simulated position is also matched to the simulated positions of the other participants (Step 284). Data indicating each participant's position as well as the other participants' relative positions is provided to the users. The competition and comparison equivalency program 240 provides information to each participant via the respective user interfaces that indicates the participant's position and the other participants' relative positions (Step 288).

As in the previous embodiment, the participants of the stationary machines may obtain visual and/or audio information that shows views of actual or simulated scenes along the actual course. Images of the other participants may be superimposed in the scenes.

Since the participants are all simulating movement along the same simulated course, a comparison of the relative simulated positions of the participants indicates how the participants compare to each other.

The process 250 continues (Step 290) until the event is over (Step 296).

In one application of this embodiment, a sponsor, such as a health club chain, can conduct a competition between participants who are in different locations throughout a country. For example, a health club chain can conduct a simulated 5K race between participants in New York, Chicago, and Los Angeles. The health club chain programs stationary exercise machines, e.g., treadmills, in each location to have the same operating characteristics and then starts the event. The participants are provided with information, e.g., visual and/or audible, that indicates how they are performing relative to each other. In this manner, participants can participate in the same competition even though they are located in different locations.

V. Alternatives

The previously disclosed embodiments describe several systems and methods that enable a participant located in one geographic area to engage in an event that involves (real or simulated) movement over a course and compare his/her performance to that of another participant (real or simulated). The various disclosed embodiments may be combined in various ways.

In alternative embodiments, additional technology may be incorporated into any of the previously disclosed systems. For example, biometric sensors may be used to provide a more detailed comparison of a participant's performance relative to another participant or to a chosen pre-recorded profile. This would allow the user to track how his/her respiration, heart rate or other biometrics compared to those of another. Use of biometric sensors in this manner may provide advantages over prior systems and may allow for additional ways to compare equivalent efforts, performances, etc.

In other alternative, equipment, such as lateral G-Force sensors or accelerometers, may be used. These would provide additional information that could be used to simulate courses in different locations. For example, this type of equipment could provide information that could be used to simulate actions, such as carving a hard turn, bursting out of a turn or slowing late when entering into a turn, which are used in fast sports events such as cycling, skating, or driving.

In another alternative, cameras (still or video) could be used to show real visual representations of spatial data, such as start points, end points, or features too fine for GPS sensors (e.g., specific rocks to step on when running, specific rails or curbs to grind while skating, and so on). Information about these features would be stored for use in providing the simulated courses.

In another alternative, the video images shown to a participant may include training or other information. For example, the video images may show a desired track through a curve, a desired pace or stride, etc. This training information may be superimposed on the video image or may be shown in side-by-side images presented to the participant. This kind of information may be shown to the participant during the event or may be reviewed by the participant after the event.

Embodiments of the disclosed systems can be implemented using networked equipment or standalone computers. Client-server or peer-to-peer technology may be used to exchange performance data.

The devices carried by the participants may include data memory for transmission of performance data and/or later uploading. Alternatively, centralized or decentralized application servers may be used to allow participants to record and share any performance data. This would allow personal best or most extreme run information to be stored and shared. Sharing this kind of information may also allow online communities to form, in which a user in any geographic area could search to determine the most extreme run on record and compete against it.

In some embodiments, the user interface provided to the participant may simply provide audio cues (e.g., "plus 2.4 seconds", "minus 42 feet", or "140 versus 156 beats per minute"). Alternatively, the user interface may be as complex as a graphically simulated representation of the opponent including real pictures or graphics with textual and graphical telemetry.

In some of the embodiments, it was described how the equivalent real or virtual course routes were determined so that participants would be able to compare their performances. Factors that may be considered in determining equivalent courses include distance, elevation changes, temperature, humidity, wind, surface, and turns. Other factors may be considered when determining equivalent courses. Some of these other factors include average time per unit distance, average $VO_2$ (volume oxygen) expelled per unit distance, average heart-rate per unit distance, time to complete a particular segment of event, calories expended, etc. Suitable equipment (e.g., heart rate monitors, etc.) may be used to obtain the information for determining these factors.

In another embodiment, personal differences may be taken into account when determining equivalent courses or when comparing performances on courses. The personal factors to be taken into account may include age, gender, physical handicaps, and so on.

In another alternative embodiment, a participant obtains course information prior to starting an event and then records his/her performance during the event. The participant records his/her performance using a suitable device, such as an appropriately programmed PDA or GPS unit, that the participant carries during the event. The device includes a data storage medium for saving the performance data. The device does not necessarily have wireless communications capability. After the event, the participant transfers the performance data from the carried device to another system, such as a personal computer or a network computer. The performance data may be transferred from the carried device by docking, synchronizing, emailing, etc. The performance data is stored for future use by the participant or by another participant. For example, the participant may want to try to improve his/her performance against prior performances.

In another alternative, the system can be used to compare other metrics of performance. Some of these other performance metrics may include horsepower, exertion, maximum leg press, G-forces, etc. These other performance metrics may be used and compared not only as informational purposes along courses, but also as objectives of comparison.

It is intended that the foregoing detailed description be regarded as illustrative rather than limiting and that it is understood that the following claims including all equivalents are intended to define the scope of the invention.

We claim:

1. A method for facilitating a first performance by a first participant in an event that includes movement along a course located in a first geographic area, the method comprising:
   using a geographic database that contains data that represents geographic features to identify geographic features in the first geographic area;
   determining the course based on the identified geographic features in the first geographic area;
   forming simulated route information for movement on a stationary device located in a second geographic area different from the first geographic area;
   providing the simulated route information to the stationary device, wherein the simulated route information causes the stationary device to simulate a substantially equivalent geographic feature of the course including selecting a substantially same distance to move upon the stationary device as covered by the course;
   comparing the first performance to a second performance, wherein the second performance is performed by a second participant on the stationary device based on the simulated route information; and
   providing an indication of the comparing of the first and the second performances to the first participant and the second participant while the first participant is engaged in the first performance and while the second participant is engaged in the second performance.

2. The method of claim 1, wherein the simulated route information causes the stationary device to simulate a substantially equivalent geographic feature of the course further including changing incline of the stationary device to substantially match a change in incline of the course.

3. The method of claim 1, wherein providing the indication of the comparing of the first and the second performances to the first participant comprises transmitting the indication of the comparing to a communication device used by the first participant.

4. The method of claim 1, wherein the stationary device comprises a treadmill exercise machine, an exercise bicycle, a rowing machine, a cross-country skiing machine, or a stair stepping machine.

5. The method of claim 1, wherein the event is one selected from a group consisting of: running, bicycling, cross-country skiing, race walking, and rowing.

6. The method of claim 1, further comprising:
   determining positions of the first participant during the first performance.

7. The method of claim 6, wherein the positions of the first participant are determined using a positioning device.

8. The method of claim 7, wherein the positioning device is selected from a group consisting of: a Global Positioning System unit, a Differential Global Positioning System unit, cell phone positioning technology that uses triangulation, cell phone positioning technology that uses time-of-arrival, cell phone positioning technology that uses direction-of arrival, and beacons.

9. The method of claim 6, wherein the positions of the first participant are transmitted as data wirelessly from a communications device located with the first participant.

10. A method for facilitating a second performance by a second participant in an event that includes movement on a stationary device, the method comprising:
    identifying, via a database, a course located in a first geographic area, wherein a first performance includes movement along the course by a first participant;
    forming simulated route information for the movement on the stationary device located in a second geographic area different from the first geographic area;
    providing the simulated route information to the stationary device, wherein the simulated route information causes the stationary device to simulate a substantially equivalent geographic feature of the course including changing incline of the stationary device to substantially match a change in incline of the course;

comparing the first performance to the second performance, wherein the second performance, performed by the second participant, is on the stationary device based on the simulated route information; and providing indication of the comparing of the first and second performances to the first participant and the second participant while the first participant is engaged in the first performance and while the second participant is engaged in the second performance.

11. The method of claim 10, further comprising:
transmitting information about the identified course to a device used by the first participant that performs the first performance.

12. The method of claim 10, wherein the stationary device comprises a treadmill exercise machine, an exercise bicycle, a rowing machine, a cross-country skiing machine, or a stair stepping machine.

13. The method of claim 10, wherein providing the indication of the comparing of the first and the second performances to the second participant comprises transmitting the indication of the comparing to a communication device.

14. The method of claim 13, wherein the communication device is coupled with or part of the stationary device.

15. A system for facilitating performances in an event, the system comprising:
a geographic database that contains data that represents geographic features in a first geographic area; and
a competition comparison and equivalency program executed on a computer system that:
uses the geographic database to identify a course,
forms simulated route information for movement on a stationary device located in a second geographic area different from the first geographic area,
provides the simulated route information to the stationary device, wherein the simulated route information causes the stationary device to simulate a substantially equivalent geographic feature of the course including changing incline of the stationary device to substantially match a change in incline of the course,
compares a first performance by a first participant to a second performance by a second participant, wherein the first performance includes movement along the course, and wherein the second performance is on the stationary device based on the simulated route information, and
indicates to the first participant and the second participant results of the comparison of the first performance to the second performance while the first participant is engaged in the first performance and while the second participant is engaged in the second performance.

16. The system of claim 15, wherein the competition comparison and equivalency program further:
provides information about the identified course to a device associated with the first participant that performs the first performance.

* * * * *